(12) United States Patent
Pora et al.

(10) Patent No.: US 11,561,147 B2
(45) Date of Patent: Jan. 24, 2023

(54) DEVICE AND METHOD FOR IMPROVED TESTING OF A HYDRAULIC PART FOR A TURBOMACHINE

(71) Applicant: SAFRAN AIRCRAFT ENGINES, Paris (FR)

(72) Inventors: Loïc Pora, Moissy-Cramayel (FR); Petar Tomov, Moissy-Cramayel (FR); Théodore Magne, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 399 days.

(21) Appl. No.: 16/875,147

(22) Filed: May 15, 2020

(65) Prior Publication Data
US 2020/0363280 A1 Nov. 19, 2020

(30) Foreign Application Priority Data
May 16, 2019 (FR) ...................................... 1905134

(51) Int. Cl.
*G01L 13/00* (2006.01)
*F04D 29/18* (2006.01)

(52) U.S. Cl.
CPC .............. *G01L 13/00* (2013.01); *F04D 29/18* (2013.01); *F05B 2260/83* (2013.01)

(58) Field of Classification Search
CPC ..... G01L 13/00; F04D 29/18; F04D 15/0088; F05B 2260/83; F04B 51/00
See application file for complete search history.

(56) References Cited

U.S. PATENT DOCUMENTS

| 9,500,068 B2 * | 11/2016 | Wang | ..................... E21B 49/006 |
| 2015/0275639 A1 * | 10/2015 | Wang | ..................... B23K 26/122 |
| | | | 73/865.6 |

FOREIGN PATENT DOCUMENTS

| CN | 20533331 U | | 6/2016 |
| CN | 105909536 A | | 8/2016 |
| CN | 106567827 A | | 4/2017 |
| CN | 107816439 A | | 3/2018 |
| CN | 107842357 A | * | 3/2018 |
| CN | 107842357 A | | 3/2018 |
| CN | 108119351 A | | 6/2018 |
| CN | 108825483 A | | 11/2018 |

OTHER PUBLICATIONS

Official Communication dated Nov. 20, 2019, in corresponding FR Application No. 1905134 (2 pages).

* cited by examiner

*Primary Examiner* — Freddie Kirkland, III
(74) *Attorney, Agent, or Firm* — Bookoff McAndrews, PLLC

(57) ABSTRACT

Device (1) for testing a hydraulic part (10) for a turbomachine, the device comprising a closed loop for circulation of a working fluid, the loop comprising at least one recirculation pump (7) configured to circulate the working fluid in the loop according to a direction of circulation, at least one valve (4) for regulating the flow rate of a working fluid, at least one reservoir (A) configured to store the working fluid, a test section (2) configured to accommodate the hydraulic part (10), the device (1) further comprising a gas injection means (8) configured to inject and dissolve, at atmospheric pressure, a gas in the working fluid stored in the reservoir (A).

17 Claims, 2 Drawing Sheets

DEVICE AND METHOD FOR IMPROVED TESTING OF A HYDRAULIC PART FOR A TURBOMACHINE

CROSS-REFERENCE TO RELATED APPLICATIONS

This disclosure claims priority to French Patent Application No. 1905134, filed on May 16, 2019, which is hereby incorporated by reference in its entirety.

TECHNICAL FIELD

This present disclosure relates to the field of fuel pumps of aeronautical turbomachines, in particular a device for testing a fuel pump of a turbomachine, and a method for testing a fuel pump using such a device.

INTRODUCTION

The inductor of a fuel pump aims at lowering the minimum acceptable inlet pressure to ensure the proper operation of the fuel pump. The inductors are generally placed upstream on the same drive shaft as the wheel in the centrifugal pumps. Their goal is in particular to prevent the phenomenon of cavitation and reduce the Net positive suction head (NPSH) required for a pump to work properly.

The cavitation phenomenon occurs when the pressure of the liquid drops below the vapor pressure of the liquid. It can generate vibrations, noises and flow rate instabilities that decrease the performances of the pump. The cavitation phenomena are sensitive to the geometry of the inductor, such as the shape of the hub, the number of vanes, or the shape of the studied leading edge. In addition, the fuels used in the aeronautical industry contain a certain amount of dissolved gas, which can be released in the event of a pressure drop. Indeed, the fuel pump of the main engine operates in various environments in terms of pressure and temperature. As the aircraft gains altitude, the pressure inside the fuel reservoir decreases and a gas release phenomenon may occur. This phenomenon can be associated with the development of the cavitation and its instabilities.

In case of appearance of the cavitation phenomenon, in the event of a pressure drop, the capacity of attachment of a pump, for example a low-pressure pump, is a fundamental issue, since it affects the operation of the engine in the event of a failure of the pump of the aircraft. The inductor is therefore, in this sense, a safety member.

The aerodynamic stall no longer allows the pump to push the gases in the right direction, and the "high-pressure" portion of the pump (at the outlet) is no longer properly supplied by the "low-pressure" portion (at the inlet). Currently, there is no internal model or bibliographic study reliably estimating the minimum pressure achievable before the stall of the pump occurs. Thus, it is necessary, at the beginning of development, to make low-pressure test benches to characterize the performances of the pump and in particular its attachment capacity. Tests on the inductors show that the major parameter affecting the suction pressure is the aeration of the fluid, the kerosene containing on the order of 15% of dissolved air, at atmospheric pressure and at room temperature. However, the current design methods do not take into account very well this major parameter and do not allow predicting the minimum achievable pressure. There is no reliable model for estimating the minimum pressure to which a fuel inductor can "attach". Thus, it is necessary, at the beginning of development, to carry out long and costly tests of a low-pressure pump to characterize the performances of the pump and in particular its attachment capacity.

There is therefore a need for a device for testing hydraulic parts that allows overcoming these drawbacks.

DISCLOSURE OF THE INVENTION

The present disclosure relates to a device for testing a hydraulic part for a turbomachine, the device comprising a closed loop for the circulation of a working fluid, the loop comprising:

at least one recirculation pump configured to circulate the working fluid in the loop according to a direction of circulation, at least one valve for regulating the flow rate of a working fluid, at least one reservoir configured to store the working fluid, a test section configured to accommodate the hydraulic part, the device further comprising a gas injection means configured to inject and dissolve, at atmospheric pressure, a gas in the working fluid stored in the reservoir.

In the present disclosure, the terms "upstream" and "downstream" are considered according to the direction of flow of the fluid in the loop. In addition, the hydraulic part can be a valve, for example, or a turbomachine pump.

In some embodiments, the hydraulic part is a turbomachine pump, the device comprising a motor configured to put the pump in rotation about an axis.

The turbomachine pump can be a kinetic pump, a jet pump or a positive displacement pump. The remainder of the description refers to a kinetic pump. However, the invention is not limited to the kinetic pumps, and can be applied to all types of hydraulic pumps sensitive to the cavitation phenomenon. More generally, the hydraulic part can be all types of hydraulic parts sensitive to the cavitation phenomenon.

The kinetic pump can be a turbomachine fuel pump configured to rotate about an axis of rotation while being activated by the engine. The kinetic pump is disposed inside the loop, in the test section, so that its axis of rotation is substantially parallel to the direction of flow of the fluid in the test section. The motor is disposed outside the loop.

The test section allows studying the performances of the kinetic pump when the fluid, circulated in the loop by the recirculation pump, flows between the upstream and the downstream of the kinetic pump.

The gas and the working fluid are determined so that, at atmospheric pressure, the gas dissolves in the working fluid. Thus, when said gas is injected into the reservoir via the injection means, the working fluid flowing in the loop, in particular in the test section, includes gas dissolved at atmospheric pressure and at ambient temperature. The presence of this dissolved gas in the working fluid thus causes, in the event of a pressure drop, the release of gas bubbles in the flow. The appearance of these gas bubbles consequently makes it possible to study the performances of the kinetic pump in the event of cavitating flow, by simulating the appearance of such a cavitation phenomenon in an actual pump operating on kerosene. Indeed, the inventors have discovered that by dissolving a gas in a working fluid, and by choosing a suitable gas/working fluid pair, a kinetic pump showed performances equivalent to a configuration in which it is tested with kerosene. In other words, in the event of a pressure drop, the stall of the pump, by using a fluid/gas pair, occurs for pressure values close to those observed by using kerosene.

It is thus possible to evaluate the performances of a kinetic pump, and to evaluate its attachment capacity by taking into account the aeration of the fluid, while dispensing with tests carried out with kerosene, these can be long and costly. It is also possible to dimension an inductor from the beginning of a program, without iteration on partial bench with kerosene. Furthermore, the tested fluid/gas mixtures are preferably non-flammable, unlike kerosene, thus improving the safety conditions under which the tests are carried out.

In some embodiments, the test section is disposed downstream of the reservoir according to the direction of circulation.

This disposition makes it possible to calm the flow rate of the working fluid flow before entering the test section.

In some embodiments, the gas injection means comprises a bottle configured to store the gas at a pressure comprised between 180 and 220 bars, and an injection valve configured to inject the gas stored in the bottle, into the reservoir.

It is thus possible to easily transfer the gas present in the bottle, in the reservoir containing the working fluid, by opening the injection valve. Indeed, the enclosure of the reservoir being at atmospheric pressure, that is to say approximately 1 bar, at the time of opening of the valve, the pressurized gas present in the bottle then enters the reservoir and dissolves in the fluid.

In some embodiments, the injection means is configured to inject a gas rate into the working fluid comprised between 10% and 35%, preferably between 15% and 30%, more preferably between 20% and 25%.

These values can be determined or modified according to the nature of the used fluid/gas pair. The bottle comprises a certain volume of gas stored thereinside. The dissolved gas rate can be adjusted using a flow meter, which allows knowing the amount injected in a given time, until obtaining the rates mentioned above when the content of the bottle is injected into the reservoir. In the event of a pressure drop, these rates allow obtaining a cavitating flow close to the conditions encountered when kerosene is used.

In some embodiments, the working fluid comprises liquid water. The working fluid can be water only, or can comprise another liquid such as oil.

In some embodiments, the gas comprises $CO_2$. The gas can be $CO_2$ only, or can comprise another gas configured to be dissolved in the liquid at atmospheric pressure.

The $CO_2$ has the advantage of easily dissolve in water at atmospheric pressure. In addition, the use of the water/$CO_2$ mixture allows considerably reducing the cost of the tests compared to the tests carried out with kerosene. The test bench is thus quick to adapt to carry out tests on the kinetic pump from the very beginning of its design. This mixture allows simulating the influence of the aeration of the fuel in an actual engine, in particular air dissolved in kerosene. This mixture being moreover non-flammable, the safety conditions under which these tests are carried out are thus improved.

In some embodiments, the test section comprises a tube having at least one transparent wall.

The presence of a transparent wall allows observing the flow of the working fluid in the test section, and in particular the cavitation phenomena around the kinetic pump. It is also possible to have a means for acquiring images such as a camera.

In some embodiments, the tube has a rectangular section. The test section thus has four walls, each of which being preferably transparent. The presence of planar and transparent walls thus allows reliably observing the flow in the test section, by limiting the phenomena of light diffraction.

In some embodiments, the loop comprises a vacuum pump. The presence of this vacuum pump allows decreasing the pressure within the loop, and thus simulating real flight conditions at high altitude.

In some embodiments, the loop comprises a second reservoir, the vacuum pump being connected to the second reservoir.

In some embodiments, the second reservoir is disposed downstream of the test section.

The second reservoir also contains the working fluid, and preferably includes a free surface. It is thus possible to regulate the pressure within the loop by means of the vacuum pump. The presence of this vacuum pump connected to the second reservoir allows reducing the pressure within the loop, and thus simulating flight conditions at high altitude of a pump present in an actual engine. This decrease allows in particular the degassing of the gas present in the working fluid, in particular of the $CO_2$ present in the water circulating in the loop.

In some embodiments, the device comprises at least four pressure sensors fixed to the walls of the test section and configured to measure the pressure of the flow within the test section.

Preferably, at least two pressure sensors are disposed downstream of the kinetic pump, and at least two sensors are disposed downstream thereof. They are each fixed to a wall of the test section, so as to be at least partially immersed in the fluid circulating in the test section. It is thus possible, by calculating the average of the pressures recorded by the various pressure sensors, to study the behavior of the flow around, in particular upstream and downstream, the kinetic pump. Particularly, it is possible to evaluate the minimum pressure achievable by the pump before it stalls.

In some embodiments, the kinetic pump is a turbomachine inductor.

In some embodiments, the kinetic pump is an inductor coupled to an impeller or an inductor coupled to an impeller and a volute, or a suction impeller coupled to a volute. The volute can be single or double with a constant or changing section.

The present disclosure also relates to a method for testing a hydraulic part using the device according to any one of the preceding embodiments, and comprising:
- the circulation of the working fluid in the loop by means of the recirculation pump,
- the regulation of the flow rate to a predetermined value using the regulating valve,
- the injection and dissolution of the gas into the reservoir through the injection means.

It is thus possible to observe the behavior of the hydraulic part, for example a kinetic pump, via the test section, taking into account the influence of the aeration of the working fluid, thanks to the gas dissolved in this working fluid. Preferably, the method includes the reading of the pressures in the test section via the pressure sensors.

In some embodiments, the pressure in the loop is decreased through the vacuum pump. The pressure decrease is preferably gradual. It is thus possible to accurately observe the pressure values from which the stall of the kinetic pump occurs.

BRIEF DESCRIPTION OF THE DRAWINGS

The invention and its advantages will be better understood upon reading the detailed description given below of various embodiments of the invention given by way of non-limiting examples. This description refers to the pages of appended figures, on which.

DESCRIPTION OF THE EMBODIMENTS

In the following description, the terms "upstream" and "downstream" are considered according to the direction of flow of the fluid in the loop, represented by the black arrows in FIG. 1.

Figure 1:
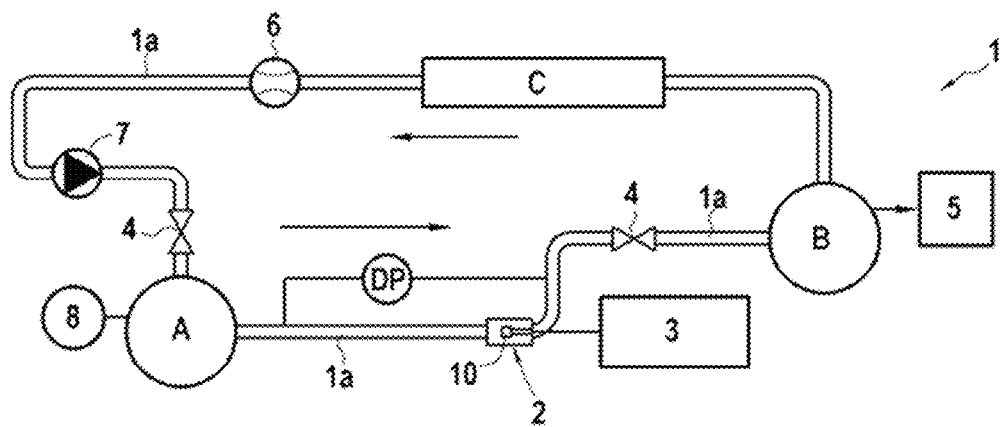
FIG. 1 represents a diagram of the testing device according to the present exposure.

FIG. 1 schematically represents a test device 1 for testing a hydraulic part, for example a fuel pump. In the embodiment described below, the tested hydraulic part is an inductor 10. The test device 1 is used to characterize the inductor 10 in a cavitating and non-cavitating mode. It comprises a duct 1a of circular section of 80 mm in diameter, for example, forming a closed loop in which a fluid can circulate.

The inductor 10 is disposed in a test section 2 and is driven by a motor 3 via a shaft 11, and can reach rotational speeds of up to 9,000 rpm, the assembly being adaptable according to the tested device. The rotational speed of the inductor is measured with a speed measuring means (not represented).

The flow rate Q of the flow can be measured by a flow meter 6 disposed between the reservoirs A and C. The flow rate is controlled by two regulating valves 4, which may be manual, located upstream and downstream of the test section 2. A circulation pump 7 is installed in series with the inductor 10 to put the fluid in circulation in the loop and overcome the head losses of the circuit in order to allow reaching high flow rates, for example 25 m$^3$/h, these flow rates may vary depending on the tested part. In addition, a differential pressure sensor DP allows determining the pressure difference between the upstream and the downstream of the test section 2.

According to this embodiment, the closed loop comprises three separate reservoirs A, B and C. The reservoir A serves as a storage reservoir with level control and air purge. It contains water and is disposed upstream of the test section 2. An injection means is disposed on a wall of the reservoir A, and allows injecting and dissolving carbon dioxide ($CO_2$), in a controlled amount, in order to control the influence of the dissolved gas content on the performances of the inductor 10. A porous medium can for example be installed at the bottom of the reservoir A, in order to inject carbon dioxide in a controlled amount. The injection means comprises a 10L bottle 8, for example, and an injection valve. It is thus possible after injection, to ensure a certain level of $CO_2$ dissolved in the water, for example 20% of $CO_2$ in the flow. Before being injected into the reservoir A, the carbon dioxide is stored at a pressure of 200 bars in the bottle 8 mounted with a regulator, or flow meter, in order to be able to control the injection process.

The reservoir B is located downstream of the test section 2 and has a free surface in order to be able to control the pressure inside the loop using a vacuum pump 5. The reservoir C is disposed downstream of the reservoir B. It can serve as a straightener of the flow, by trapping gas bubbles in its upper portion.

The test section 2 is disposed between two pipe portions 1a of the loop, by means of sealed uprights 2b, also serving as a support for the device 1. The test section 2 has a rectangular section, and comprises four transparent walls 2a making it possible to minimize the effect of light refraction. A high-speed camera can be used to take pictures at a sampling frequency of 1 kHz or higher depending on the desired resolution, for example, in order to compare the dynamics of the flux in the vicinity of the inductor 10 under different conditions. A high-speed video recording can also be performed at 1 kHz with the high-speed camera by using a white backlit LED.

Figure 2:
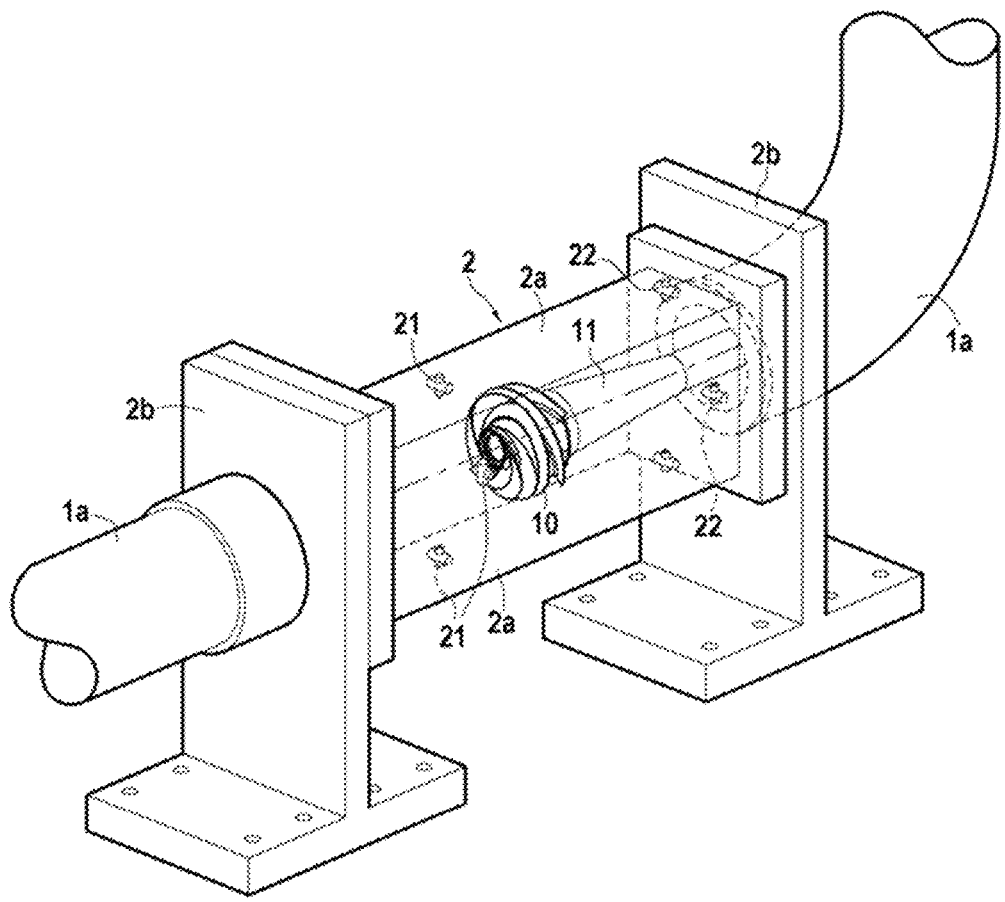
FIG. 2 represents a perspective view of the test section according to the present disclosure.

The test section 2 comprises an inlet section, upstream of the inductor 10, and an outlet section, downstream of the inductor 10. The inlet and outlet sections are equipped with means for measuring and converting pressure, such as pressure sensors or transducers 21, 22 (having a range from 0 to 400 kPa), making it possible to average the pressure outside the inductor 10 on the selected section, for example at four points. In this example, four pressure sensors 21 (three sensors 21 being visible in FIG. 2) are disposed on the inlet section. More specifically, a sensor 21 is disposed on each wall 2a of the test section 2. Similarly, four pressure sensors 22 (three sensors 22 being visible in FIG. 2) are disposed on the outlet section. More specifically, a sensor 22 is disposed on each wall 2a of the test section 2.

The position of the pressure sensors in the test section 2 can be of 1 diameter (or 1 D) upstream of the leading edge of the inductor 10 for the sensors 21 of the inlet section, and of 0.75 diameter (or 0.75 D) downstream of the inductor 10 for the sensors 22 of the outlet section. The "diameter" here designates the hydraulic diameter, that is to say the diameter of the duct 1a in the present case. Consequently, by "1 diameter" is understood a distance equal to the diameter of the duct 1a. The proximity of the pressure sensors 21 to the inlet of the inductor can cause fluctuations in the pressure measurement. In order to avoid these fluctuations, the differential pressure sensor DP allows obtaining the pressure generated between two segments distant from the inductor 10, for example 20 diameters (20 D) or less, for example 9 D or 7 D depending on the dimensions of the device, upstream of the test section 2, (there is very little head losses between the outlet of reservoir A and the inlet of test section 2) and 11.25 diameters (11.25 D) or less, for example 7 D or 5 D depending on the dimensions of the device, downstream of the test section 2. A water sample can also be taken from the bottom of the reservoir C before each test, and be analyzed by a $CO_2$ probe in order to control the concentration (in mg/L) of carbon dioxide dissolved in the loop.

The device 1 described above allows comparing the performances of the inductor in cavitating and non-cavitating mode. To do so, the test procedure without cavitation is as follows: at a given rotational speed, the water circulation flow rate is slowly increased using the regulating valve located downstream of the test section, until a predetermined flow rate threshold value is reached. In this case, the threshold value can be a flow rate of 25 m$^3$/h.

The experimental procedure in cavitating mode is as follows: at a given rotational speed, the flow rate is adjusted to a predetermined threshold value, which may be of 20 m$^3$/h in this case. The initial conditions are therefore different for each rotational speed and each flow rate. The inlet pressure drop is achieved using the vacuum pump 5, which also aims at simulating the altitude. The $CO_2$ is injected as follows. After adjusting the flow rate to 20 m$^3$/h, the valve connecting the $CO_2$ bottle 8 to the reservoir A is opened, letting the device operate for 10 minutes. In this way, the injected $CO_2$ is dissolved homogeneously.

In the present embodiment, the tests are carried out on an axial inductor 10 with three blades (or vanes), in cavitating and non-cavitating modes, in closed loop with water at constant temperature as working fluid. The tests carried out on this device are for example carried out at a temperature of T=18±1° C. A temperature probe (not represented) can be used to measure the average temperature during the tests.

Based on the pressure, flow rate and $CO_2$ concentration measurements, head curves compared to the net positive suction head (NPSH) are determined for different Reynolds numbers. The results indicate in particular that the dissolved $CO_2$ decreases the performances of the inductor: the stall of the pump occurs at a higher NPSH and increases the intensity of the cavitation. Indeed, when degassing takes place, small bubbles of gas are observed and the single-phase flux turns into a homogeneous mixture with two phases.

Figure 3A:
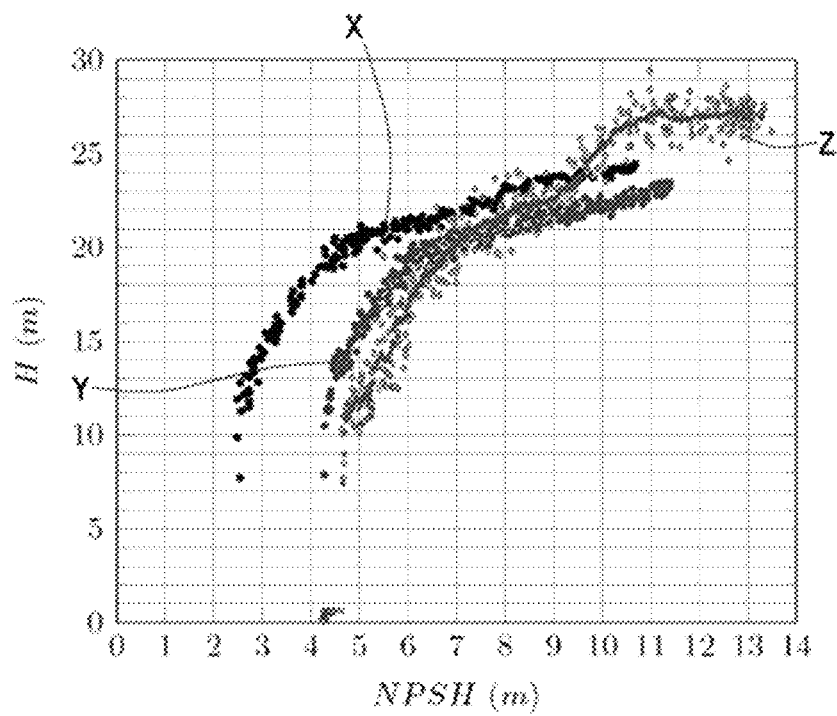
FIGS. 3A and 3B are graphs comparing the behavior of a kinetic pump operating on kerosene, with a kinetic pump tested with the device of the present disclosure.
Figure 3B:
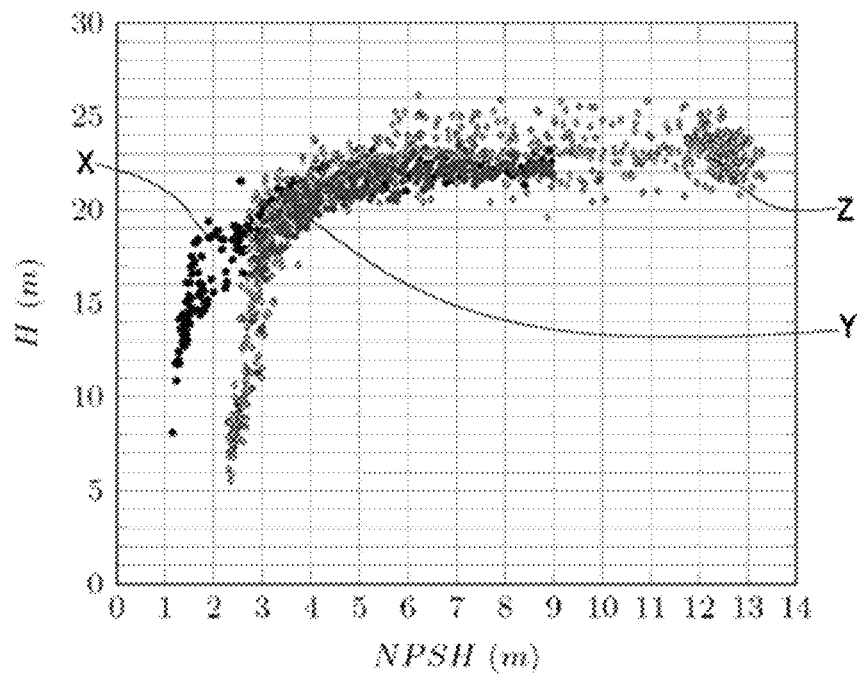

FIGS. 3A and 3B show examples of measurements made on the inductor 10 with three blades (or vanes), rotating at a speed of 6,800 rpm (revolutions per minute), with a flow rate of 1,000 l/h (liters per hour, FIG. 3A), and 10,000 l/h (FIG. 3B). The curves show the change of the dynamic head (inlet pressure) H as a function of the minimum pressure NPSH necessary for the suction of the pump. The dynamic head H is defined by $H=P/\rho g$, where P is the pressure, $\rho$ the density of the fluid and g the acceleration of gravity. The readings X (black dots) show the values recorded in the absence of $CO_2$ in the flow, the readings Y (gray dots) show the values recorded with 20% $CO_2$ in the flow, and the readings Z (white dots) show the values recorded in the case of kerosene. The readings Z were obtained on a bench identical to that of the present embodiment with water and $CO_2$, and with the same components. The measurement means were placed in the same places, in order to obtain a reliable comparison of the different readings. The drop of the curve Z in FIG. 3A shows a similar flow dynamics between the curves Z and Y. The NPSH is almost identical to the stall. The curves Y and Z overlap, the dynamic behavior being substantially identical for the flow rate at 10,000 l/h (FIG. 3B). The stall of the pump occurs for values close to NPSH, for the curves Y and Z. The performances of the pump in the case of the water/$CO_2$ mixture can therefore be transposable with kerosene.

Given these data, it is thus possible, via this device, to study the behavior of a pump, here of the inductor 10, when it operates under real conditions with kerosene. Particularly, the presence of the $CO_2$ in water makes it possible to simulate the influence of the aeration of kerosene. This in particular allows better understanding the phenomena in question in order to adapt the design practices, and to allow dimensioning the pump or criticizing the dimensioning of the suppliers from the start of the phase of study of the inductor.

Although the present invention has been described with reference to specific exemplary embodiments, it is obvious that modifications and changes can be made to these examples without departing from the general scope of the invention as defined by the claims. Particularly, individual characteristics of the various illustrated/mentioned embodiments can be combined in additional embodiments. Consequently, the description and the drawings should be considered in an illustrative rather than restrictive sense.

It is also obvious that all the characteristics described with reference to one method are transposable, alone or in combination, to one device, and conversely, all the characteristics described with reference to one device are transposable, alone or in combination, to one method.

The invention claimed is:

1. A device for testing a hydraulic part for a turbomachine, the device comprising a closed loop for circulation of a working fluid, the loop comprising:
    at least one recirculation pump configured to circulate the working fluid in the loop according to a direction of circulation,
    at least one valve for regulating the flow rate of the working fluid,
    at least one reservoir configured to store the working fluid,
    a test section configured to accommodate the hydraulic part, the device further comprising a gas injection means configured to inject and dissolve, at atmospheric pressure, a gas in the working fluid stored in the reservoir.

2. The device according to claim 1, wherein the hydraulic part is a turbomachine pump, the device comprising a motor configured to put the pump in rotation about an axis.

3. The device according to claim 1, wherein the test section is disposed downstream of the reservoir according to the direction of circulation.

4. The device according to claim 1, wherein the gas injection means comprises a bottle configured to store the gas at a pressure comprised between 180 and 220 bars, and an injection valve configured to inject the gas stored in the bottle, into the reservoir.

5. The device according to claim 1, wherein the working fluid comprises liquid water, and the gas comprises CO2.

6. The device according to claim 1, wherein the test section comprises a tube of rectangular section having at least one transparent wall.

7. The device according to claim 1, wherein the loop comprises a second reservoir downstream of the test section, and a vacuum pump connected to the second reservoir.

8. The device according to claim 6, comprising at least four pressure sensors fixed to the walls of the test section and configured to measure the pressure of the flow within the test section.

9. The device according to claim 7, wherein the vacuum pump is configured to decrease the pressure of the fluid in the loop, so as to cause the release of gas bubbles in the flow, from the gas dissolved at atmospheric pressure.

10. A method for testing a hydraulic part using the test device according to claim 1, comprising:
    the circulation of the working fluid in the loop by means of the recirculation pump,
    the regulation of the flow rate to a predetermined value using the regulating valve, and
    the injection and the dissolution of the gas into the reservoir through the injection means.

11. The method according to claim 10, wherein the pressure of the fluid in the loop is decreased through the vacuum pump.

12. The device according to claim 1, wherein the test section comprises a tube of rectangular section having four walls, each of which being transparent.

13. The device according to claim 7, wherein the loop comprises a third reservoir disposed downstream of the second reservoir, and serving as a straightener of the flow, by trapping gas bubbles in its upper portion.

14. The device according to claim 7, wherein the vacuum pump is connected directly to the second reservoir.

15. The device according to claim 1, wherein the injection means is configured to inject a gas rate into the working fluid, the gas rate being between 10% and 35%.

16. The device according to claim 15, wherein the injection means is configured to inject a gas rate into the working fluid, the gas rate being between 15% and 30%.

17. The device according to claim 15, wherein the injection means is configured to inject a gas rate into the working fluid, the gas rate being between 20% and 25%.

\* \* \* \* \*